United States Patent
Piersall et al.

(10) Patent No.: US 9,328,664 B2
(45) Date of Patent: May 3, 2016

(54) TRANSITION SUPPORT SYSTEM FOR COMBUSTION TRANSITION DUCTS FOR TURBINE ENGINES

(71) Applicants: Keith W. Piersall, Winter Springs, FL (US); Yevgeniy Shteyman, West Palm Beach, FL (US); Robert Angel, Hobe Sound, FL (US); Ashley N. Girdich, Orlando, FL (US); Robert T. Brooks, Chuluota, FL (US); James Alfonso, Palm Beach Gardens, FL (US); James Marshall, Lugoff, SC (US)

(72) Inventors: Keith W. Piersall, Winter Springs, FL (US); Yevgeniy Shteyman, West Palm Beach, FL (US); Robert Angel, Hobe Sound, FL (US); Ashley N. Girdich, Orlando, FL (US); Robert T. Brooks, Chuluota, FL (US); James Alfonso, Palm Beach Gardens, FL (US); James Marshall, Lugoff, SC (US)

(73) Assignee: SIEMENS ENERGY, INC., Orlando, FL (US)

( * ) Notice: Subject to any disclaimer, the term of this patent is extended or adjusted under 35 U.S.C. 154(b) by 217 days.

(21) Appl. No.: 14/074,911

(22) Filed: Nov. 8, 2013

(65) Prior Publication Data

US 2015/0128609 A1 May 14, 2015

(51) Int. Cl.
| | |
|---|---|
| *F02C 7/20* | (2006.01) |
| *F02C 9/16* | (2006.01) |
| *F23R 3/60* | (2006.01) |
| *F01D 9/02* | (2006.01) |
| *F01D 25/04* | (2006.01) |
| *F23R 3/46* | (2006.01) |

(52) U.S. Cl.
CPC . *F02C 7/20* (2013.01); *F01D 9/023* (2013.01); *F01D 25/04* (2013.01); *F02C 9/16* (2013.01); *F23R 3/46* (2013.01); *F23R 3/60* (2013.01); *F05D 2260/30* (2013.01); *F05D 2260/96* (2013.01); *F23R 2900/00014* (2013.01)

(58) Field of Classification Search
CPC ........... F01D 9/023; F01D 25/04; F23R 3/60; F02C 7/20; F05D 2260/30; F05D 2260/96
USPC ..................................... 60/796, 799
See application file for complete search history.

(56) References Cited

U.S. PATENT DOCUMENTS

| 2,650,817 | A | * | 9/1953 | Cover ....................... F16F 1/26 267/48 |
|---|---|---|---|---|
| 3,759,038 | A | | 9/1973 | Scalzo et al. |
| 7,247,002 | B2 | | 7/2007 | Albrecht et al. |
| 8,387,394 | B2 | | 3/2013 | Hase et al. |
| 2006/0171812 | A1 | | 8/2006 | Albrecht et al. |
| 2008/0008584 | A1 | | 1/2008 | Shteyman et al. |
| 2008/0101927 | A1 | | 5/2008 | Strain et al. |
| 2009/0145137 | A1 | | 6/2009 | Rizkalla et al. |
| 2012/0023968 | A1 | | 2/2012 | Brooks et al. |

* cited by examiner

*Primary Examiner* — Ehud Gartenberg
*Assistant Examiner* — Filippo Manfredi (57) ABSTRACT

An adjustable transition duct support system for a transition duct that channels hot gases from a combustor exit to a gas turbine inlet of a turbine engine. The adjustable transition duct support system includes an adjustable forward transition flexible support assembly in contact with a transition duct body, whereby the forward transition flexible support assembly may be formed from a base extending toward the transition duct body and first and second side support arms extending from the base to the transition duct body. The first and second side support arms may be formed from a plurality of flex plates spaced from each other with spacers that provide rigidity in circumferential and radial directions and flexibility in an axial direction. The number of flex plates used may be varied to accommodate different turbine engines. The adjustable transition duct support system may have natural frequencies for circumferential and radial modes above two engine orders.

20 Claims, 11 Drawing Sheets

TRANSITION SUPPORT SYSTEM FOR COMBUSTION TRANSITION DUCTS FOR TURBINE ENGINES

FIELD OF THE INVENTION

The invention relates in general to combustion turbine engines and, more specifically, to support systems for transition ducts for routing combustor exhaust gas flow from combustors to a turbine assembly of a combustion turbine engine.

BACKGROUND OF THE INVENTION

Typically, gas turbine engines include a compressor for compressing air, a combustor for mixing the compressed air with fuel and igniting the mixture, and a turbine blade assembly for producing power. Transition ducts extend between a combustor and a turbine blade assembly to direct combustor gases through the turbine blade assembly to impart rotational movement on the rotor of the turbine blade assembly. Conventional transition ducts are typically formed from a plenum that requires support from more rigid mounting support structure at the exit that is welded to the plenum. The rigid support structure is used for affixing the transition assembly to the turbine inlet. This rigid support structure is also used to support the exit seals that are used to prevent cold compressed air from entering into the turbine directly.

During operation, gas turbine engines operate at high temperatures and expose the transition ducts to hot combustion gases. The transition ducts are supported by a transition support. The support is susceptible to extreme temperatures and vibrations. The vibrations cause the seals on the transition duct to fail prematurely. Thus, a need exists for a more robust system of attaching a transition duct to a turbine inlet of a turbine engine with less vibration.

SUMMARY OF THE INVENTION

This invention is directed to an adjustable transition duct support system for a transition duct that channels hot gases from a combustor exit to a gas turbine inlet of a turbine engine. The adjustable transition duct support system may include an adjustable forward transition flexible support assembly in contact with a transition duct body, whereby the forward transition flexible support assembly may be formed from a base extending toward the transition duct body and first and second side support arms extending from the base to the transition duct body. The first and second side support arms may be formed from a plurality of flex plates spaced from each other with spacers that provide rigidity in circumferential and radial directions and flexibility in an axial direction. The number of flex plates used may be varied to accommodate different turbine engines. The adjustable transition duct support system may have natural frequencies for circumferential and radial modes above two engines orders, which is two times an engine revolutions per minute divided by the frequency or 2(3600)/60=120 Hertz.

The adjustable transition duct support system configured for a transition duct that channels hot gases from a combustor exit to a gas turbine inlet of a turbine engine may include a transition duct body formed from an outer wall that forms an internal passage extending between an inlet and an outlet of the transition duct body. The support system may also include an adjustable forward transition flexible support assembly in contact with the transition duct body, wherein the forward transition flexible support assembly may be formed from a base extending toward the transition duct body, and a first side support arm and a second side support arm may extend from the base to the transition duct body. The first side support arm may be formed from a plurality of first side flex plates spaced from each other with spacers, wherein the first side flex plates provide rigidity in circumferential and radial directions and flexibility in an axial direction. The second side support arm may be formed from a plurality of second side flex plates spaced from each other with spacers, wherein the second side flex plates provide rigidity in circumferential and radial directions and flexibility in the axial direction.

In at least one embodiment, the first side flex plates may be formed from between two and eighteen flex plates between 0.5 millimeters and 2.5 millimeters. In another embodiment, the first side flex plates may be formed from between eight and twelve flex plates between 1.0 millimeters and 2.0 millimeters. Similarly, the second side flex plates may be formed from between two and eighteen flex plates between 0.5 millimeters and 2.5 millimeters. In another embodiment, the second side flex plates may be formed from between eight and twelve flex plates between 1.0 millimeters and 2.0 millimeters.

The base may be configured to provide a sturdy, structural sound, unbending foundation to which the first and second arms are attached. The base may be formed from a top beam and a bottom beam that are coupled together via first and second outer columns separated by a middle column. The first and second columns have thicknesses less than a thickness of the middle column.

The first side support arm may include a first outer bracket and a second outer bracket at an outer end adjacent the transition duct body, wherein the first and second outer brackets are subject to a compressive force towards each other, thereby placing outer ends of the first side flex plates under compression. The first side support arm may include a first inner bracket and a second inner bracket at an inner end adjacent the transition duct body, wherein the first and second inner brackets are subject to a compressive force towards each other, thereby placing inner ends of the first side flex plates under compression. The first and second outer brackets may be placed under compression via one or more bolts. The first side support arm may also include a first pin and a second pin extending from the first outer bracket, through the first side flex plates, to the second outer bracket to reduce loads other than compressive loads in the one or more bolts extending from the first outer bracket to the second outer bracket. The first and second inner brackets may be placed under compression via one or more bolts. The first side support arm may also include a first pin and a second pin extending from the first inner bracket, through the first side flex plates, to the second inner bracket to reduce loads other than compressive loads in the one or more bolts extending from the first inner bracket to the second inner bracket.

The second side support arm may include a first outer bracket and a second outer bracket at an outer end adjacent the transition duct body. The first and second outer brackets may be subject to a compressive force towards each other, thereby placing outer ends of the second side flex plates under compression. The second side support arm may include a first inner bracket and a second inner bracket at an inner end adjacent the transition duct body, wherein the first and second inner brackets are subject to a compressive force towards each other, thereby placing inner ends of the second side flex plates under compression. The first and second outer brackets of the second side support arm may be placed under compression via one or more bolts. A first pin and a second pin may extend from the first outer bracket, through the second side flex plates, to the second outer bracket to reduce loads other than compressive loads in the one or more bolts extending from the first outer bracket to the second outer bracket. The first and second inner brackets of the second side support arm may be placed under compression via one or more bolts. A first pin and a second pin extending from the first inner bracket, through the second side flex plates, to the second inner bracket to reduce loads other than compressive loads in the one or more bolts extending from the first inner bracket to the second outer bracket of the second side support arm.

The first side flex plates forming the first side support arm may be formed from an outer attachment section and an inner attachment section separated by a transition section having linear sides that are nonlinear with sides forming the outer and inner attachment sections, thereby positioning the outer attachment section offset laterally from the inner attachment section. The second side flex plates forming the second side support arm may be formed from an outer attachment section and an inner attachment section separated by a transition section having linear sides that are nonlinear with sides forming the outer and inner attachment sections, thereby positioning the outer attachment section offset laterally from the inner attachment section.

The first side and second side support arms may be formed from the plurality of first and second side flex plates that are aligned with each other within each arm, wherein each side support arm has their larger, outer planar surfaces aligned with a longitudinal axis of a top beam of the base. The base may have a width, as measured orthogonal to a direction of flow of hot gas through the transition duct body, that is at least 80 percent of a width of the transition duct body measured orthogonal to a direction of flow of hot gas through the transition duct body.

The transition duct support system may be an adjustable system. The first and second outer brackets of the first and second side support arms may include at least one orifice with a racetrack configuration enabling axial adjustment. The first and second inner brackets of the first and second side support arms include at least one orifice with a racetrack configuration enabling lateral adjustment. The transition duct support system may also include one or more shims positioned between the first and second side support arms and the base for radial adjustment.

The adjustable forward transition flexible support assembly may have a natural frequency in the radial mode greater than 150 Hertz, in the circumferential mode greater than 100 Hertz, in the torsional mode greater than 150 Hertz and in the axial mode greater than 100 Hertz.

An advantage of the adjustable transition duct support system is that the adjustable forward transition flexible support assembly limits vibration in the radial and lateral directions relative to the centerline via enhanced radial and lateral stiffness, thereby reducing wear on the combustor spring clips and exit frame seals that seal the transition duct.

Another advantage of the adjustable transition duct support system is that the multicolumn base increases the width of the mounting location and moves the top surface of the base closer to the transition and closer to the two mounting locations on the transition inlet ring.

Yet another advantage of the adjustable transition duct support system is that the number of flex plates used in the first and second side support arms may be varied to adjust the axial stiffness of the adjustable forward transition flexible support assembly.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF EMBODIMENTS OF THE INVENTION

Figure 1:
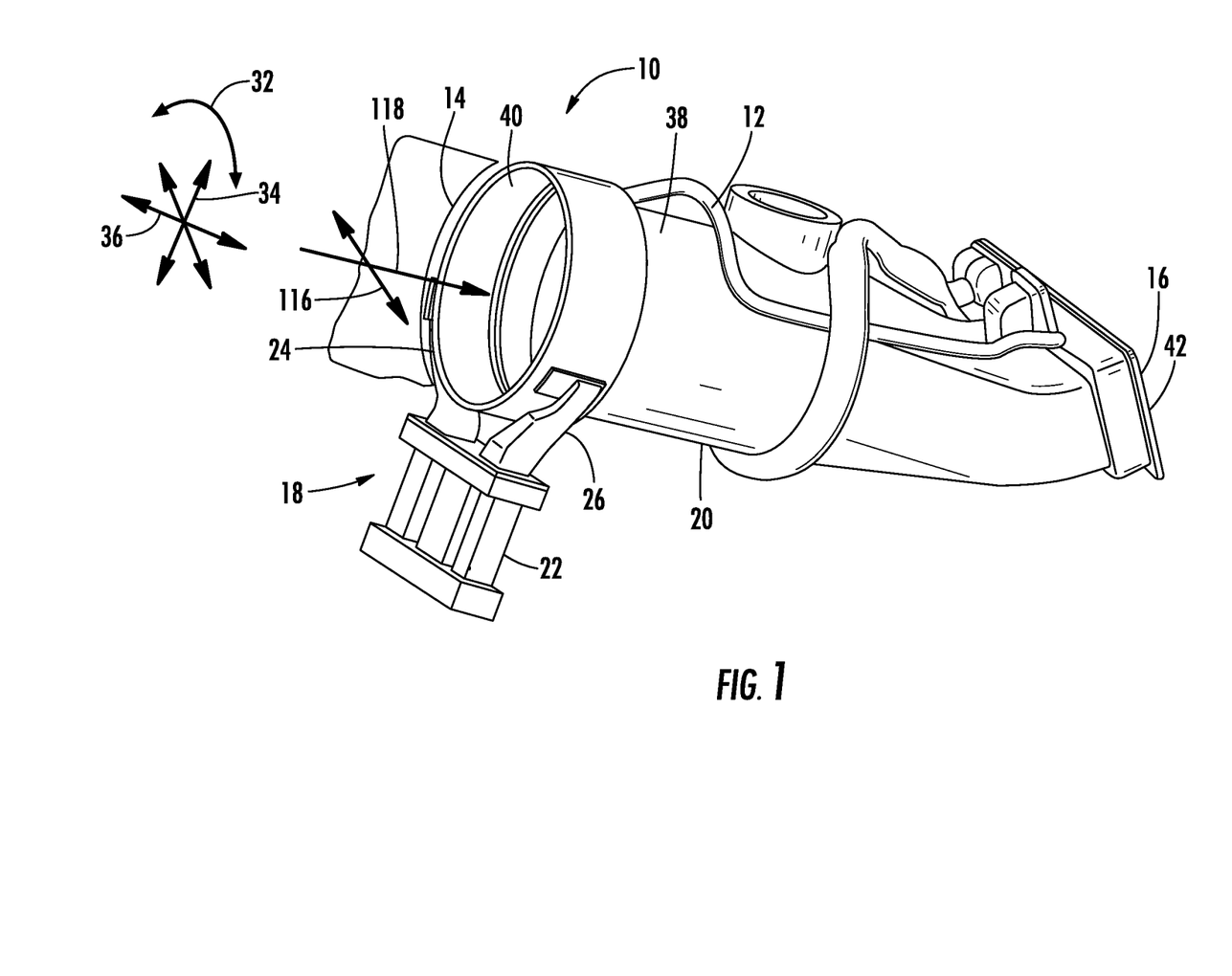
FIG. 1 is a perspective view of the adjustable transition duct support system of this invention.
Figure 2:
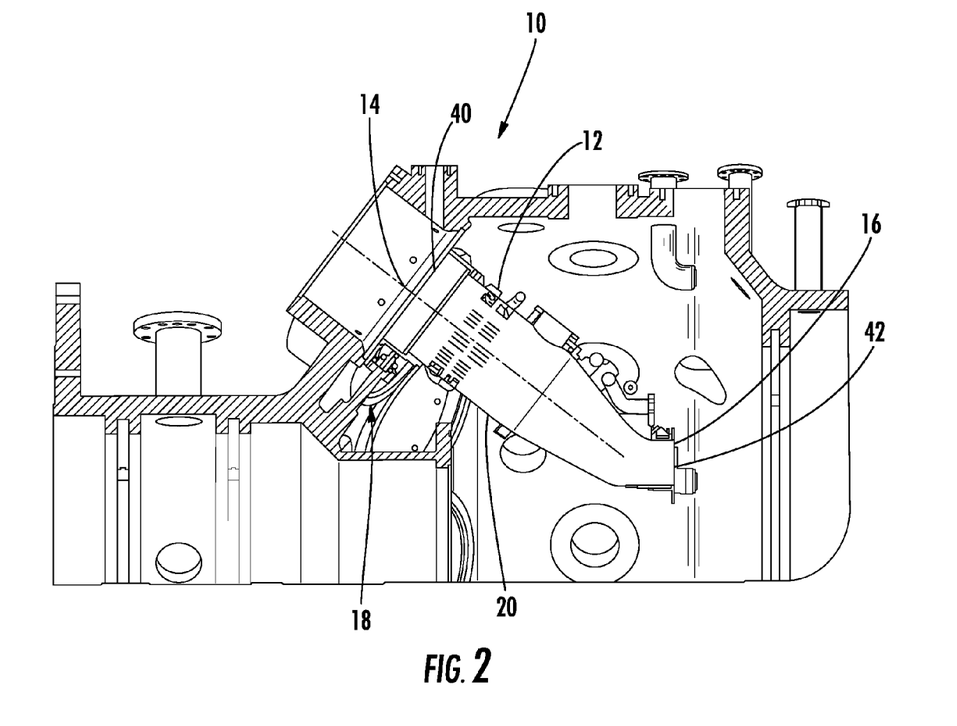
FIG. 2 is a cross-sectional view of the transition duct support system positioned in a gas turbine engine.
Figure 3:
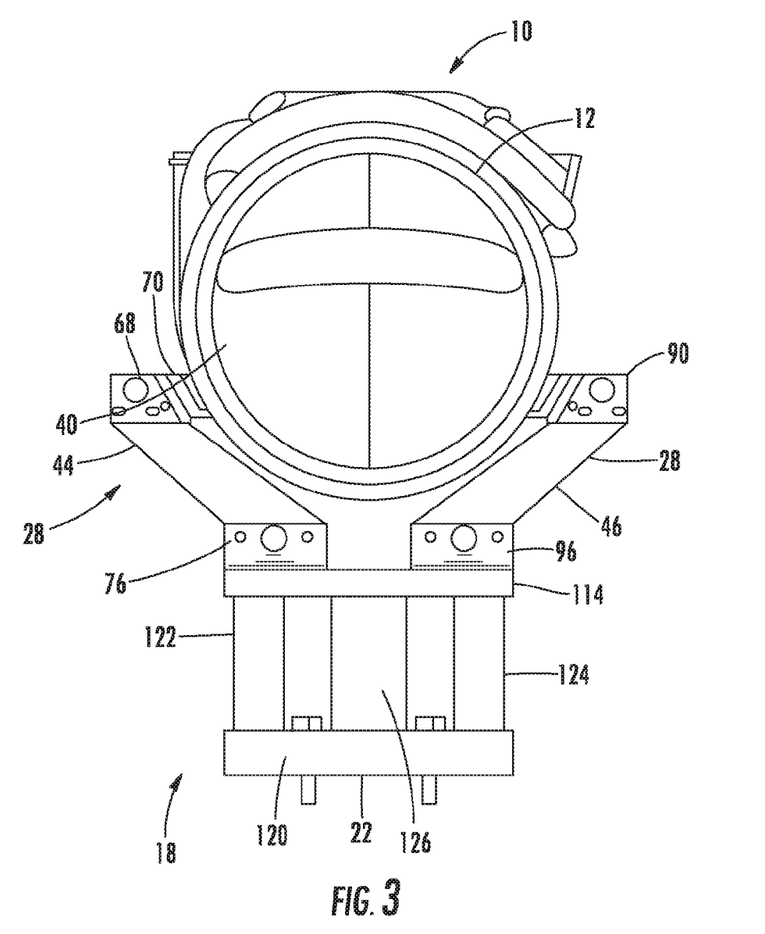
FIG. 3 is an end view of adjustable transition duct support system of FIG. 1.
Figure 4:
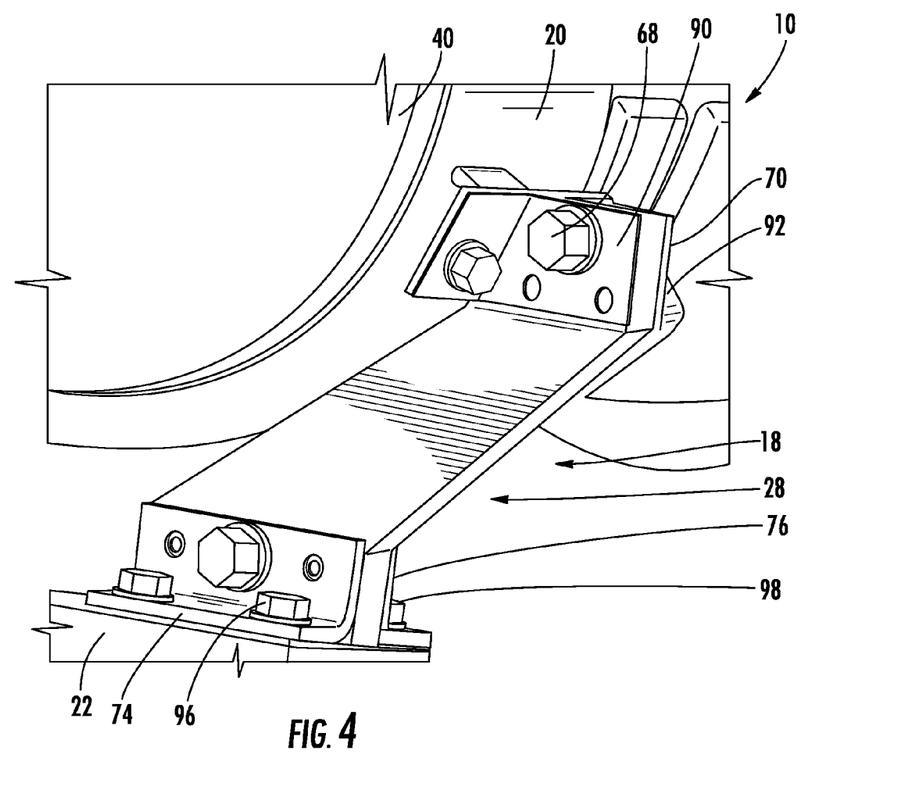
FIG. 4 is a perspective, detailed view of a side support arm of the adjustable transition duct support system.

As shown in FIGS. 1-28, this invention is directed to an adjustable transition duct support system 10 for a transition duct 12 that channels hot gases from a combustor exit 14 to a gas turbine inlet 16 of a turbine engine. The adjustable transition duct support system 10 may include an adjustable forward transition flexible support assembly 18 in contact with a transition duct body 20, whereby the forward transition flexible support assembly 18 may be formed from a base 22 extending toward the transition duct body 20 and first and second side support arms 24, 26 extending from the base 22 to the transition duct body 20. The first and second side support arms 24, 26 may be formed from a plurality of flex plates 28, as shown in FIGS. 5-8 spaced from each other with spacers 30 that provide rigidity in circumferential and radial directions 32, 34 and flexibility in an axial direction 36, as shown in FIG. 1. The number of flex plates 28 used may be varied to accommodate different turbine engines. The adjustable transition duct support system 10 may have natural frequencies for circumferential and radial modes above two engine orders, which is two times an engine revolutions per minute divided by the frequency or 2(3600)/60=120 Hertz.

As shown in FIG. 1, the adjustable transition duct support system 10 may include a transition duct body 20 formed from an outer wall 38 that forms an internal passage extending between an inlet 40 and an outlet 42 of the transition duct body 20. The adjustable forward transition flexible support assembly 18 may be formed from the base 22 extending toward the transition duct body 20 and a first side support arm 24 and a second side support arm 26 extending from the base 22 to the transition duct body 20. The first side support arm 24 may be formed from a plurality of first side flex plates 44 spaced from each other with spacers 30, as shown in FIGS. 5-8. In particular, the first side flex plates may be spaced from each other with outer spacers 31 and inner spacers 33. The first side flex plates 44 may provide rigidity in circumferential and radial directions 32, 34 and flexibility in the axial direction 36. The second side support arm 26 may be formed from a plurality of second side flex plates 46 spaced from each other with spacers 30. The second side flex plates 46 may provide rigidity in circumferential and radial directions 32, 34 and flexibility in the axial direction 36.

The adjustable transition duct support system 10 may be adjustable in that the number of flex plates 28 may be varied. One of the first side and second side support arms 24, 26, or both, may have any appropriate number of flex side plates 28. In at least one embodiment, the first side support arm 24 may be formed from between two and eighteen first side flex plates 44. The first side flex plates 44 may be between 0.5 millimeters and 2.5 millimeters in thickness. In another embodiment, the first side flex plates 44 may number between eight and twelve first side flex plates 44. The first side flex plates 44 may be between 1.0 millimeters and 2.0 millimeters in thickness. In yet another embodiment, the first side flex plates 44 may be about 1.5 millimeters in thickness. The first side support arm 24 my include 10 first side flex plates 44.

The second side support arms 26 may also be formed from between two and eighteen second side flex plates 46. The second side flex plates 46 may be between 0.5 millimeters and 2.5 millimeters in thickness. In another embodiment, the second side flex plates 46 may number between eight and twelve second side flex plates 46. The second side flex plates 46 may be between 1.0 millimeters and 2.0 millimeters in thickness. In yet another embodiment, the second side flex plates 46 may be about 1.5 millimeters in thickness. The second side support arm 26 my include 10 second side flex plates 46.

Figure 10:
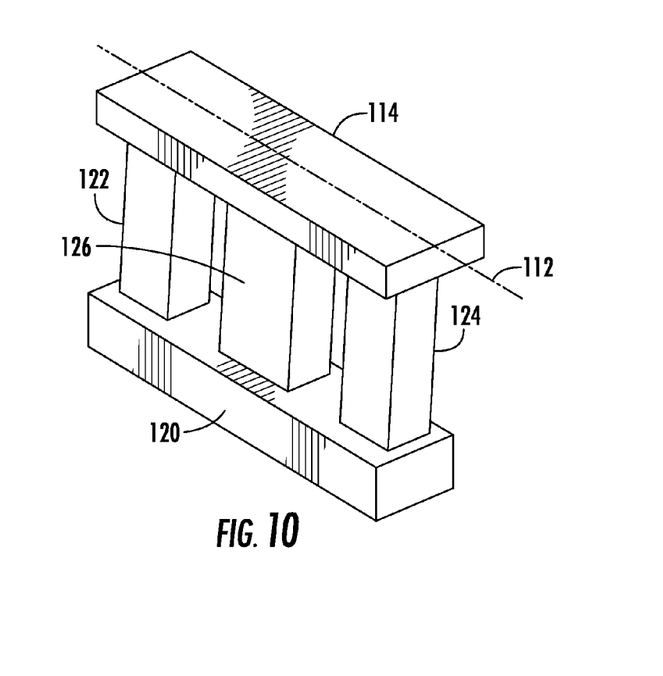
FIG. 10 is a perspective view of the base of the adjustable transition duct support system.

The first side and second side support arms 24, 26 may be formed from the plurality of first and second side flex plates 44, 46 that are aligned with each other within each arm 24, 26, as shown in FIGS. 1, 3, 5 and 7. Each side support arm 24, 26 may have its larger, outer planar surfaces 110 aligned with a longitudinal axis 112 (FIG. 10) of a top beam 114 of the base 22. The base 22 may have a width, as measured orthogonal 116 to a direction 118 of flow of hot gas through the transition duct body, that is at least 80 percent of a width of the transition duct body 20 measured orthogonal to a direction of flow 118 of hot gas through the transition duct body 20. The base 22, as shown in FIG. 10, may be formed from the top beam 114 and a bottom beam 120 that are coupled together via first and second outer columns 122, 124 separated by a middle column 126. The first and second columns 122, 124 may have thicknesses less than a thickness of the middle column 126. In at least one embodiment, the outer columns 122, 124 may be about 60 millimeters wide and about 40 millimeters thick, and the middle column 126 may be about 85 millimeters wide and about 40 millimeters thick.

Figure 11:
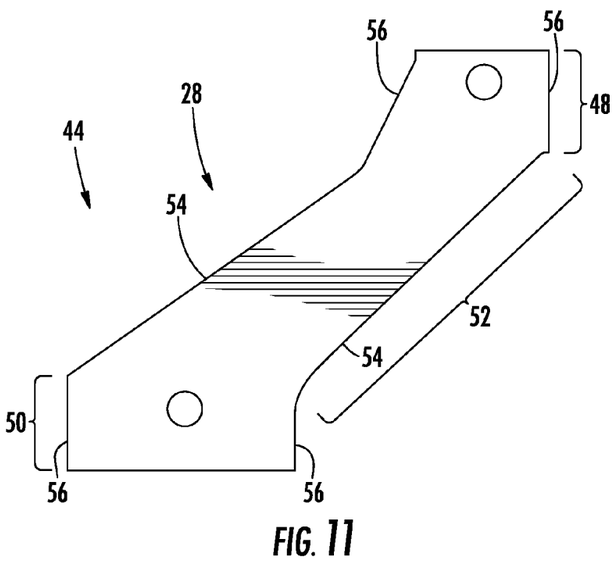
FIG. 11 is a planar side view of a flex plate of a first side support arm of the adjustable transition duct support system.
Figure 12:
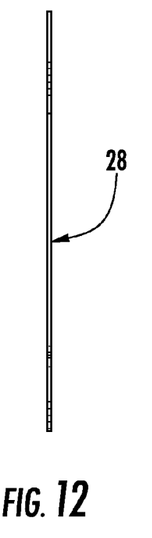
FIG. 12 is an end view of the flex plate of FIG. 11.
Figure 13:
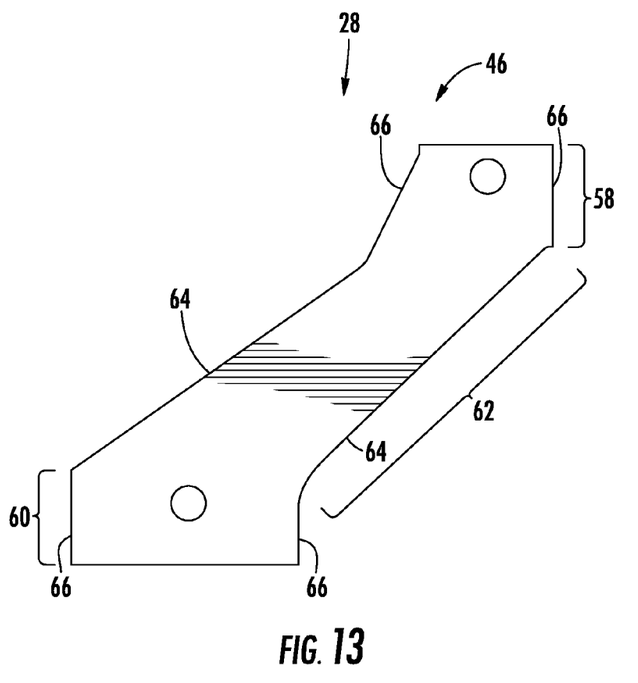
FIG. 13 is a is a planar side view of a flex plate of a second side support arm of the adjustable transition duct support system.
Figure 14:
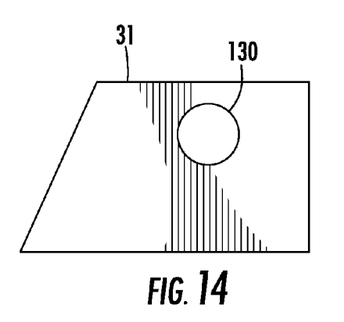
FIG. 14 is a side view of an outer spacer usable between adjacent flex plates.
Figure 15:
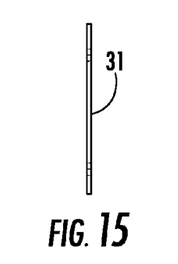
FIG. 15 is an end view of the outer spacer of FIG. 14.
Figure 16:
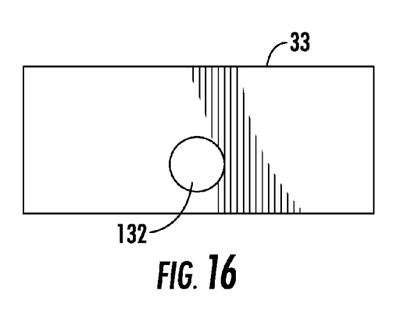
FIG. 16 is a side view of an inner spacer usable between adjacent flex plates.
Figure 17:
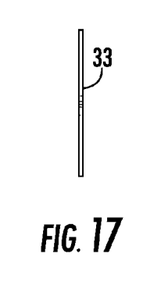
FIG. 17 is an end view of the inner spacer of FIG. 16.

As shown in FIGS. 11 and 12, the first side flex plates 44 may be formed from an outer attachment section 48 and an inner attachment section 50 separated by a transition section 52 having linear sides 54 that are nonlinear with sides 56 forming the outer and inner attachment sections 48, 50, thereby positioning the outer attachment section 48 offset laterally from the inner attachment section 50. Similarly, the second side flex plates 46, as shown in FIG. 13, may be formed from an outer attachment section 58 and an inner attachment section 60 separated by a transition section 62 having linear sides 64 that are nonlinear with sides 66 forming the outer and inner attachment sections 58, 60, thereby positioning the outer attachment section 58 offset laterally from the inner attachment section 60.

Figure 5:
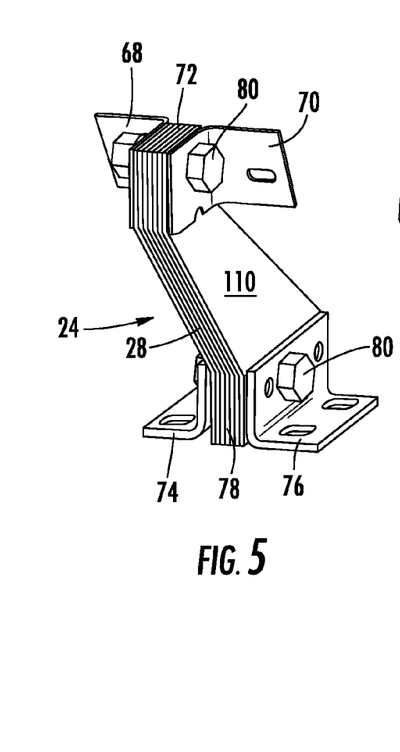
FIG. 5 is another perspective, detailed view of the first side support arm of the adjustable transition duct support system.
Figure 6:
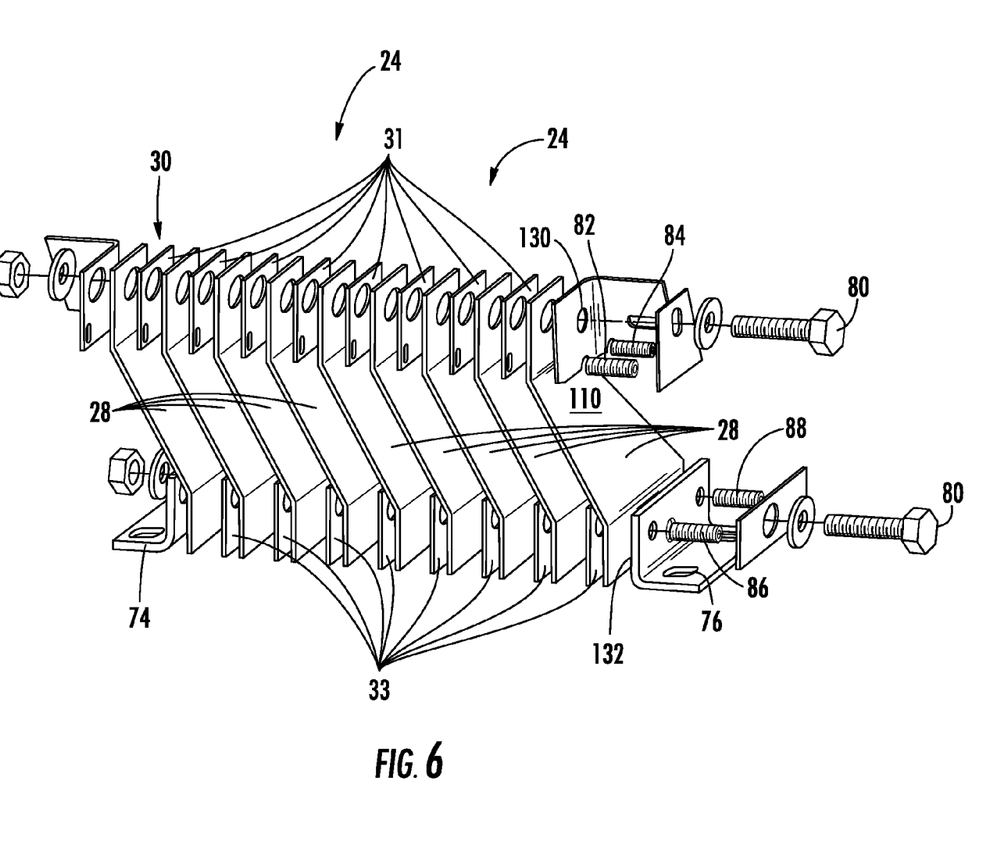
FIG. 6 is an exploded, perspective view of the first side support arm of the adjustable transition duct support system.
Figure 7:
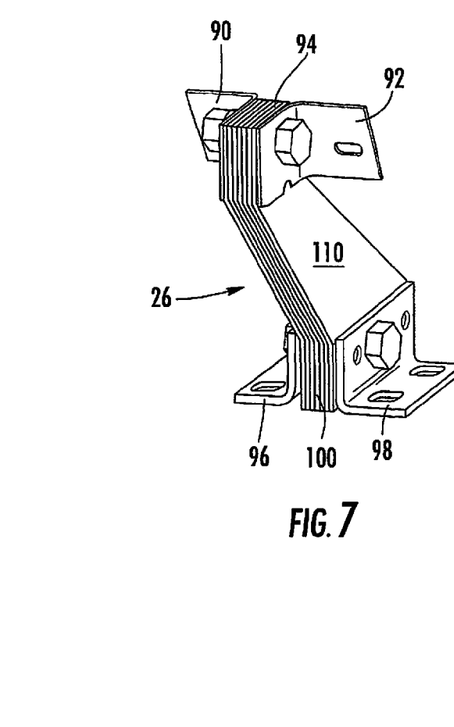
FIG. 7 is a perspective, detailed view of the second side support arm of the adjustable transition duct support system.
Figure 8:
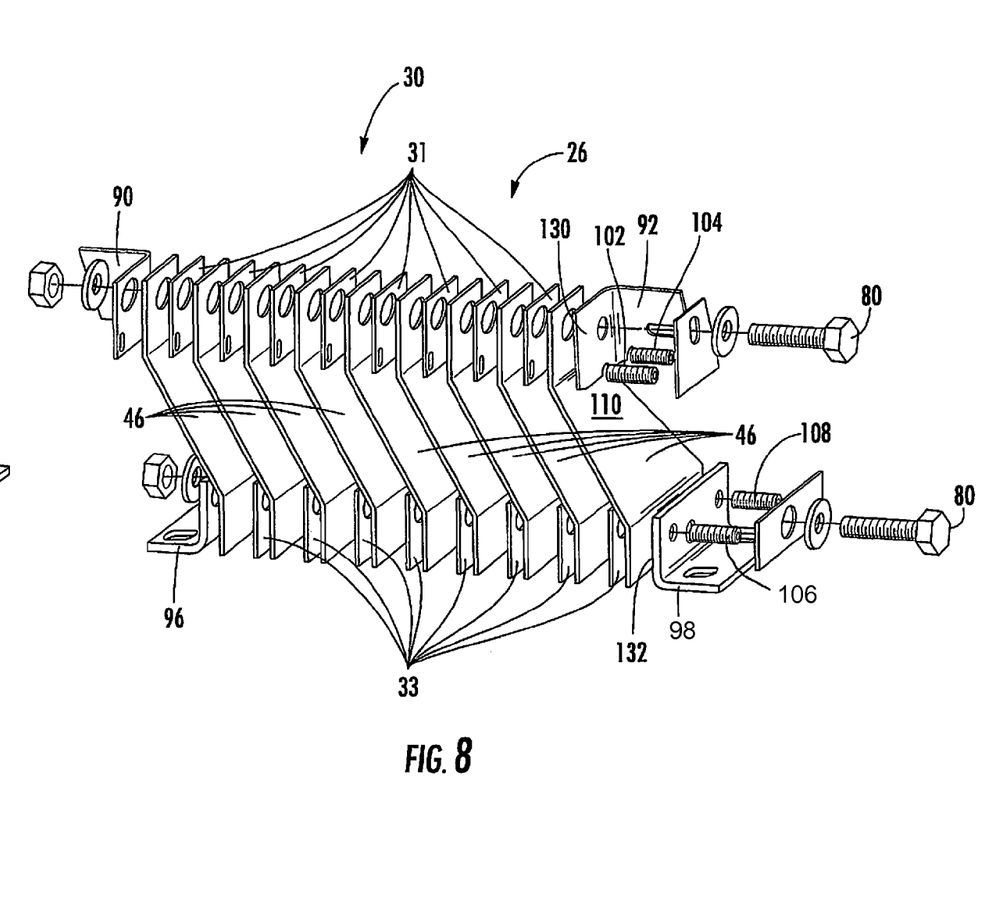
FIG. 8 is an exploded, perspective view of the second side support arm of the adjustable transition duct support system of FIG. 7.
Figure 9:
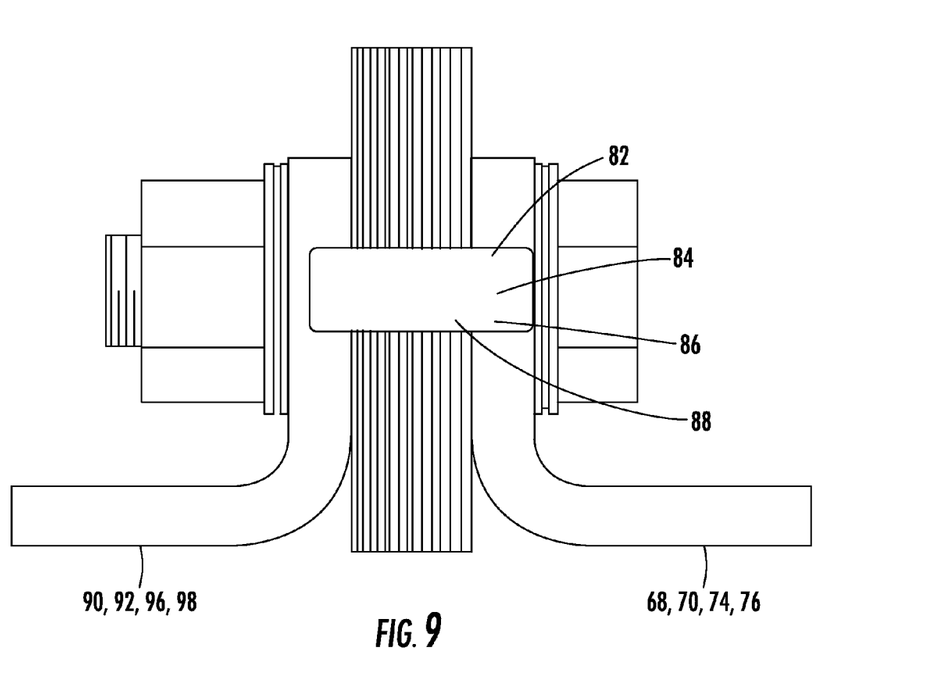
FIG. 9 is a detailed view of inner brackets attached to flex plates forming a side support arm and configured to be attached to the base.

As shown in FIGS. 5 and 6, the first side support arm 24 may include a first outer bracket 68 and a second outer bracket 70 at an outer end 72 adjacent the transition duct body 20. The first and second outer brackets 68, 70 may be subject to a compressive force towards each other, thereby placing outer ends 72 of the first side flex plates 44 under compression. The first side support arm 24 may include a first inner bracket 74 and a second inner bracket 76 at an inner end 78 adjacent the transition duct body 20. The first and second inner brackets 74, 76 may be subject to a compressive force towards each other, thereby placing inner ends 78 of the first side flex plates 44 under compression. The first and second outer brackets 68, 70 may be placed under compression via one or more bolts 80. The bolts 80 may extend through orifices 130 in the first and second outer brackets 68, 70. The first and second outer brackets 68, 70 may include one or more pins. In particular, the first and second outer brackets 68, 70 may include a first pin 82 and a second pin 84 extending from the first outer bracket 68, through the first side flex plates 44, to the second outer bracket 70 to reduce loads other than compressive loads in the one or more bolts 80 extending from the first outer bracket 68 to the second outer bracket 70, as shown in FIGS. 5, 6, 23 and 24. Similarly, as shown in FIGS. 7 and 8, the first and second inner brackets 96, 98 may be placed under compression via one or more bolts 80. The bolts 80 may extend through orifices 132 in the first and second inner brackets 96, 98. A first pin 106 and a second pin 108 may extend from the first inner bracket 96, through the second side flex plates 46, to the second inner bracket 98 to reduce loads other than compressive loads in the one or more bolts 80 extending from the first inner bracket 96 to the second inner bracket 98.

Figure 25:
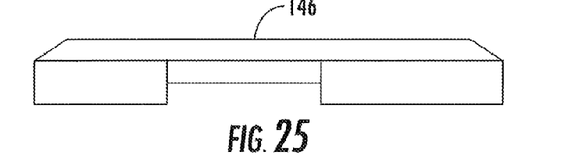
FIG. 25 is a top view of a spacer clamp plate usable to clamp the flex plates to the inner brackets.
Figure 26:
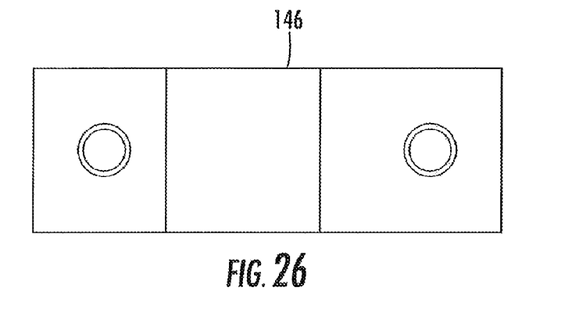
FIG. 26 is a front view of the spacer clamp plates of FIG. 25.

The second side support arm 26 may include a first outer bracket 90 and a second outer bracket 92 at an outer end 94 adjacent the transition duct body 20. The first and second outer brackets 90, 92 may be subject to a compressive force towards each other, thereby placing outer ends 94 of the second side flex plates 46 under compression. The second side support arm 26 may include a first inner bracket 96 and a second inner bracket 98 at an inner end 100 adjacent the transition duct body 20. The first and second inner brackets 96, 98 may be subject to a compressive force towards each other, thereby placing inner ends 100 of the second side flex plates 46 under compression. The first and second outer brackets 90, 92 may be placed under compression via one or more bolts 80. The bolts 80 may extend through orifices 132 in the first and second inner brackets 96, 98 and compress the spacer clamp plates 146, as shown in FIGS. 25 and 26. A first pin 102 and a second pin 104 may extend from the first outer bracket 90, through the second side flex plates 46, to the second outer bracket 92 to reduce loads other than compressive loads in the one or more bolts 80 extending from the first outer bracket 90 to the second outer bracket 92. The first and second inner brackets 96, 98 may be placed under compression via one or more bolts 80. A first pin 106 and a second pin 108 may extend from the first inner bracket 96, through the second side flex plates 46, to the second inner bracket 98 to reduce loads other than compressive loads in the one or more bolts 80 extending from the first inner bracket 96 to the second inner bracket 98.

Figure 18:
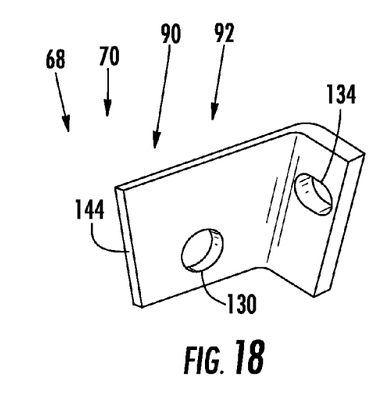
FIG. 18 is a perspective view of an outer bracket usable to attached the flex plates to the turbine duct body.
Figure 19:
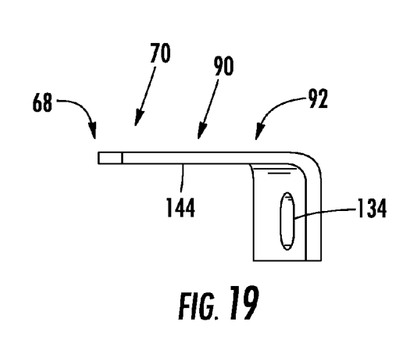
FIG. 19 is a top view of the outer bracket of FIG. 18.
Figure 20:
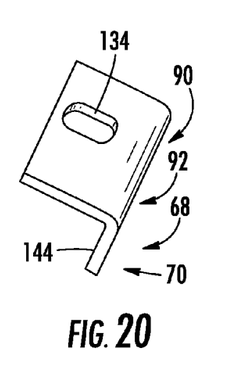
FIG. 20 is an offset end view of the outer bracket of FIG. 18.

The first and second outer brackets 68, 70 and 90, 92 of the first and second side support arms 24, 26 may each include at least one orifice 134 with a racetrack configuration enabling axial adjustment, as shown in FIGS. 18-20. The orifices 134 may be positioned in a transition duct portion of the first and second outer brackets 68, 70 and 90, 92 that is configured to engage the transition duct body 20. The orifice 134 may be elongated in the axial direction 36 to enable the orifice 134 provide for adjustability in the axial direction 36. The elongated orifices 134 may be referred to as a racetrack configuration. In at least one embodiment, the transition duct portion may be generally orthogonal to the flex plate attachment portion 144 of the first and second outer brackets 68, 70 and 90, 92 of the first and second side support arms 24, 26.

Figure 21:
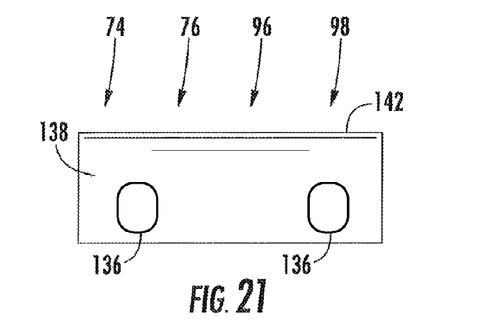
FIG. 21 is a top view of an inner bracket usable to attached the flex plates to the base.
Figure 22:
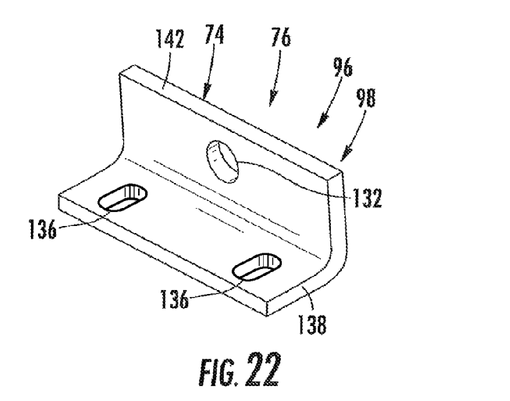
FIG. 22 is a perspective view of the inner bracket of FIG. 21.
Figure 23:
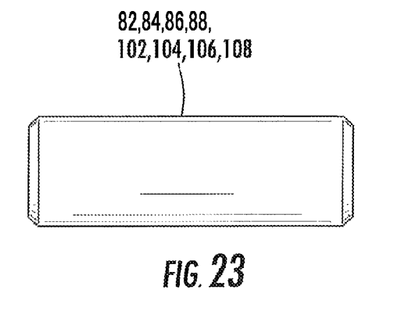
FIG. 23 is side view of a pin usable in the outer and inner support brackets.
Figure 24:
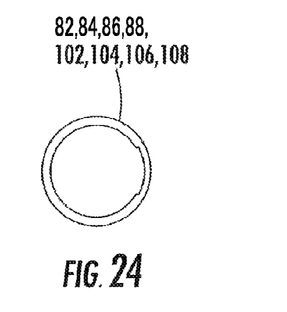
FIG. 24 is an end view of the pin of FIG. 23.

The first and second inner brackets 74, 76 and 96, 98 of the first and second side support arms 24, 26 may each include at least one orifice 136 with a racetrack configuration enabling axial adjustment, as shown in FIGS. 21-22. The orifices 136 may be positioned in a base attachment portion 138 (FIG. 22) of the first and second inner brackets 74, 76 and 96, 98 that is configured to engage the transition duct body 20. The orifice 134 may be elongated in the axial direction 36 to enable the orifice 136 provide for adjustability in the axial direction. The elongated orifices 136 may be referred to as a racetrack configuration. In at least one embodiment, the base attachment portion 138 may be generally orthogonal to the flex plate attachment portion 142 of the first and second inner brackets 74, 76 and 96, 98 of the first and second side support arms 24, 26.

Figure 27:
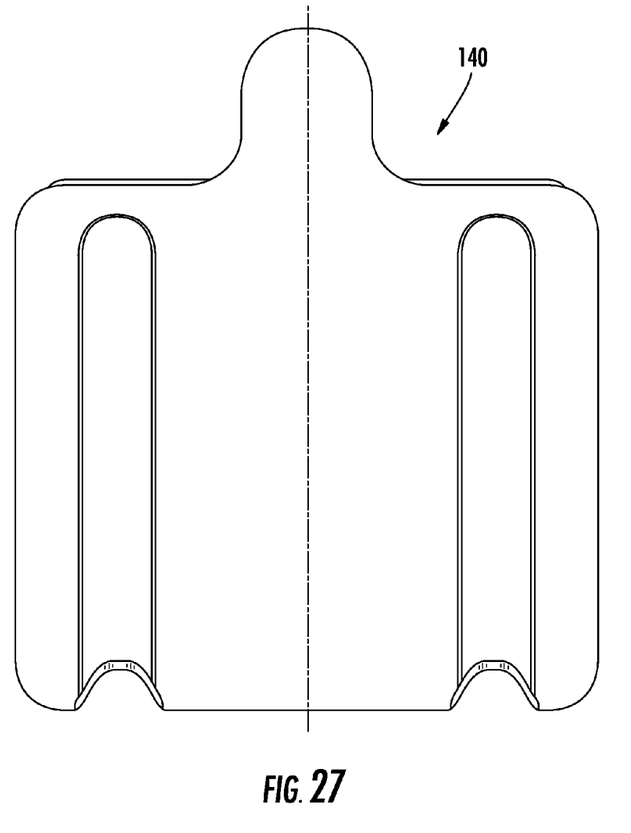
FIG. 27 is a front view of a shim usable to adjust the base radially outward.
Figure 28:
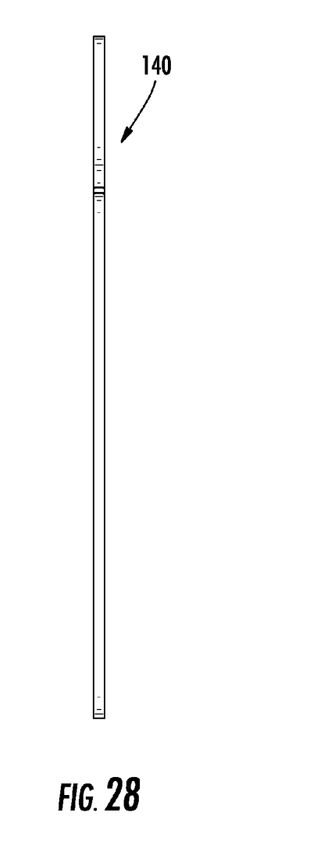
FIG. 28 is a side view of the shim of FIG. 27.

The adjustable transition duct support system 10 may also include one or more shims 140, as shown in FIGS. 27 and 28, having any appropriate shape and dimensions capable of being used to adjust the location of the respective outer attachment sections 48, 58 of the first and second support arms 24, 26, respectively. In particular, the shims 140 may be used to adjust the outer attachment sections 58 of the first and second support arms 24, 26 radially for radial adjustment.

The adjustable forward transition flexible support assembly 18 may have a natural frequency in the radial mode greater than 150 Hertz, in a circumferential mode greater than 100 Hertz, in a torsional mode greater than 150 Hertz and in an axial mode greater than 100 Hertz. In at least one embodiment, the adjustable forward transition flexible support assembly 18 may have a natural frequency in the radial mode between about 210 Hertz and about 232 Hertz, in a circumferential mode between about 120 Hertz and about 134 Hertz, in a torsional mode between about 210 Hertz and about 232 Hertz and in an axial mode between about 110 Hertz and about 126 Hertz.

The foregoing description is provided in the context of a few possible constructions of such a transition duct and associated turbine subsystem. Thus, it will of course be understood that the invention is not limited to the specific details described herein, which are given by way of example only, and that various modifications and alterations are possible within the scope of the invention as defined in the following claims.

We claim:

1. An adjustable transition duct support system for a transition duct that channels hot gases from a combustor exit to a gas turbine inlet of a turbine engine, comprising:
a transition duct body formed from an outer wall that forms an internal passage extending between an inlet and an outlet of the transition duct body;
an adjustable forward transition flexible support assembly in contact with the transition duct body, wherein the forward transition flexible support assembly is formed from a base extending toward the transition duct body, and a first side support arm and a second side support arm extending from the base to the transition duct body;
wherein the first side support arm is formed from a plurality of first side flex plates spaced from each other with spacers, wherein the first side flex plates provide rigidity in circumferential and radial directions and flexibility in an axial direction; and
wherein the second side support arm is formed from a plurality of second side flex plates spaced from each other with spacers, wherein the second side flex plates provide rigidity in circumferential and radial directions and flexibility in the axial direction.

2. The transition duct support system of claim 1, wherein the first side flex plates are formed from between two and eighteen flex plates between 0.5 millimeters and 2.5 millimeters in thickness.

3. The transition duct support system of claim 2, wherein the first side flex plates are formed from between eight and twelve flex plates between 1.0 millimeters and 2.0 millimeters in thickness.

4. The transition duct support system of claim 1, wherein the second side flex plates are formed from between two and eighteen flex plates between 0.5 millimeters and 2.5 millimeters in thickness.

5. The transition duct support system of claim 4, wherein the second side flex plates are formed from between eight and twelve flex plates between 1.0 millimeters and 2.0 millimeters in thickness.

6. The transition duct support system of claim 1, wherein the base is formed from a top beam and a bottom beam that are coupled together via first and second outer columns separated by a middle column.

7. The transition duct support system of claim 6, wherein the first and second columns have thicknesses less than a thickness of the middle column.

8. The transition duct support system of claim 1, wherein the first side support arm includes a first outer bracket and a second outer bracket at an outer end adjacent the transition duct body, wherein the first and second outer brackets are subject to a compressive force towards each other, thereby placing outer ends of the first side flex plates under compression, and wherein the first side support arm includes a first inner bracket and a second inner bracket at an inner end adjacent the transition duct body, wherein the first and second inner brackets are subject to a compressive force towards each other, thereby placing inner ends of the first side flex plates under compression.

9. The transition duct support system of claim 8, wherein the first and second outer brackets are placed under compression via one or more bolts and further comprising a first pin and a second pin extending from the first outer bracket, through the first side flex plates, to the second outer bracket to reduce loads other than compressive loads in the one or more bolts extending from the first outer bracket to the second outer bracket, and wherein the first and second inner brackets are placed under compression via one or more bolts and further comprising a first pin and a second pin extending from the first inner bracket, through the first side flex plates, to the second inner bracket to reduce loads other than compressive loads in the one or more bolts extending from the first inner bracket to the second inner bracket.

10. The transition duct support system of claim 1, wherein the second side support arm includes a first outer bracket and a second outer bracket at an outer end adjacent the transition duct body, wherein the first and second outer brackets are subject to a compressive force towards each other, thereby placing outer ends of the second side flex plates under compression, and wherein the second side support arm includes a first inner bracket and a second inner bracket at an inner end adjacent the transition duct body, wherein the first and second inner brackets are subject to a compressive force towards each other, thereby placing inner ends of the second side flex plates under compression.

11. The transition duct support system of claim 10, wherein the first and second outer brackets are placed under compression via one or more bolts and further comprising a first pin and a second pin extending from the first outer bracket, through the second side flex plates, to the second outer bracket to reduce loads other than compressive loads in the one or more bolts extending from the first outer bracket to the second outer bracket, and wherein the first and second inner brackets are placed under compression via one or more bolts and further comprising a first pin and a second pin extending from the first inner bracket, through the second side flex plates, to the second inner bracket to reduce loads other than compressive loads in the one or more bolts extending from the first inner bracket to the second outer bracket.

12. The transition duct support system of claim 1, wherein the first side flex plates are formed from an outer attachment section and an inner attachment section separated by a transition section having linear sides that are nonlinear with sides forming the outer and inner attachment sections, thereby positioning the outer attachment section offset laterally from the inner attachment section.

13. The transition duct support system of claim 1, wherein the second side flex plates are formed from an outer attachment section and an inner attachment section separated by a transition section having linear sides that are nonlinear with sides forming the outer and inner attachment sections, thereby positioning the outer attachment section offset laterally from the inner attachment section.

14. The transition duct support system of claim 1, wherein first and second outer brackets of the first and second side support arms include at least one orifice with a racetrack configuration enabling axial adjustment; wherein first and second inner brackets of the first and second side support arms include at least one orifice with a racetrack configuration further enabling the axial adjustment; and further comprising at least one shim positioned between the first and second side support arms and the base for radial adjustment.

15. The transition duct support system of claim 1, wherein the adjustable forward transition flexible support assembly has a natural frequency in the radial mode greater than 150 Hertz, in the circumferential mode greater than 100 Hertz, in the torsional mode greater than 150 Hertz and in the axial mode greater than 100 Hertz.

16. An adjustable transition duct support system for a transition duct that channels hot gases from a combustor exit to a gas turbine inlet of a turbine engine, comprising:
a transition duct body formed from an outer wall that forms an internal passage extending between an inlet and an outlet of the transition duct body;
an adjustable forward transition flexible support assembly in contact with the transition duct body, wherein the forward transition flexible support assembly is formed from a base extending toward the transition duct body, and a first side support arm and a second side support arm extending from the base to the transition duct body;
wherein the first side support arm is formed from a plurality of first side flex plates spaced from each other with spacers, wherein the first side flex plates provide rigidity in circumferential and radial directions and flexibility in an axial direction;
wherein the second side support arm is formed from a plurality of second side flex plates spaced from each other with spacers, wherein the second side flex plates provide rigidity in circumferential and radial directions and flexibility in the axial direction;
wherein the first side flex plates are formed from an outer attachment section and an inner attachment section separated by a transition section having linear sides that are nonlinear with sides forming the outer and inner attachment sections, thereby positioning the outer attachment section offset laterally from the inner attachment section;
wherein the first side and second side support arms are formed from the plurality of first and second side flex plates that are aligned with each other within each arm, wherein each side support arm has their larger, outer planar surfaces aligned with a longitudinal axis of a top beam of the base;
wherein first and second outer brackets of the first and second side support arms include at least one orifice with a racetrack configuration enabling axial adjustment; wherein first and second inner brackets of the first and second side support arms include at least one orifice with a racetrack configuration further enabling the axial adjustment; and further comprising at least one shim positioned between the first and second side support arms and the base for radial adjustment; and
wherein the base is formed from a top beam and a bottom beam that are coupled together via first and second outer columns separated by a middle column and wherein the first and second columns have thicknesses less than a thickness of the middle column.

17. The transition duct support system of claim 16, wherein the first side flex plates are formed from between two and eighteen flex plates between 0.5 millimeters and 2.5 millimeters and the first side flex plates are formed from between eight and twelve flex plates between 1.0 millimeters and 2.0 millimeters in thickness.

18. The transition duct support system of claim 16, wherein the first side support arm includes a first outer bracket and a second outer bracket at an outer end adjacent the transition duct body, wherein the first and second outer brackets are subject to a compressive force towards each other, thereby placing outer ends of the first side flex plates under compression, and wherein the first side support arm includes a first inner bracket and a second inner bracket at an inner end adjacent the transition duct body, wherein the first and second inner brackets are subject to a compressive force towards each other, thereby placing inner ends of the first side flex plates under compression, wherein the first and second outer brackets are placed under compression via one or more bolts and further comprising a first pin and a second pin extending from the first outer bracket, through the first side flex plates, to the second outer bracket to reduce loads other than compressive loads in the one or more bolts extending from the first outer bracket to the second outer bracket, and wherein the first and second inner brackets are placed under compression via one or more bolts and further comprising a first pin and a second pin extending from the first inner bracket, through the first side flex plates, to the second inner bracket to reduce loads other than compressive loads in the one or more bolts extending from the first inner bracket to the second inner bracket, wherein the second side support arm includes a first outer bracket and a second outer bracket at an outer end adjacent the transition duct body, wherein the first and second outer brackets are subject to a compressive force towards each other, thereby placing outer ends of the second side flex plates under compression, and wherein the second side support arm includes a first inner bracket and a second inner bracket at an inner end adjacent the transition duct body, wherein the first and second inner brackets are subject to a compressive force towards each other, thereby placing inner ends of the second side flex plates under compression, wherein the first and second outer brackets are placed under compression via one or more bolts and further comprising a first pin and a second pin extending from the first outer bracket, through the second side flex plates, to the second outer bracket to reduce loads other than compressive loads in the one or more bolts extending from the first outer bracket to the second outer bracket, and wherein the first and second inner brackets are placed under compression via one or more bolts and further comprising a first pin and a second pin extending from the first inner bracket, through the second side flex plates, to the second inner bracket to reduce loads other than compressive loads in the one or more bolts extending from the first inner bracket to the second outer bracket.

19. The transition duct support system of claim 16, wherein the base has a width, as measured orthogonal to a direction of flow of hot gas through the transition duct body, that is at least 80 percent of a width of the transition duct body measured orthogonal to a direction of flow of hot gas through the transition duct body.

20. The transition duct support system of claim 16, wherein the adjustable forward transition flexible support assembly has a natural frequency in the radial mode greater than 150 Hertz, in the circumferential mode greater than 100 Hertz, in the torsional mode greater than 150 Hertz and in the axial mode greater than 100 Hertz.

* * * * *